(12) United States Patent
Cannata

(10) Patent No.: US 9,603,492 B2
(45) Date of Patent: Mar. 28, 2017

(54) SOAP WITH HANDLE

(71) Applicant: Joseph M. Cannata, Highland Hts., OH (US)

(72) Inventor: Joseph M. Cannata, Highland Hts., OH (US)

(*) Notice: Subject to any disclaimer, the term of this patent is extended or adjusted under 35 U.S.C. 154(b) by 0 days.

(21) Appl. No.: 14/946,414

(22) Filed: Nov. 19, 2015

(65) Prior Publication Data

US 2016/0338550 A1    Nov. 24, 2016

Related U.S. Application Data

(60) Provisional application No. 62/165,843, filed on May 22, 2015.

(51) Int. Cl.
| | |
|---|---|
| *A47K 5/05* | (2006.01) |
| *A47K 5/04* | (2006.01) |
| *B29C 39/10* | (2006.01) |
| *B29K 105/20* | (2006.01) |
| *B29K 105/00* | (2006.01) |
| *B29L 31/00* | (2006.01) |

(52) U.S. Cl.
CPC .............. *A47K 5/04* (2013.01); *A47K 5/05* (2013.01); *B29C 39/10* (2013.01); *B29K 2105/0058* (2013.01); *B29K 2105/20* (2013.01); *B29L 2031/769* (2013.01)

(58) Field of Classification Search
CPC ........................................................ A47K 5/05
USPC .................................................. 401/6, 8, 88
See application file for complete search history.

(56) References Cited

U.S. PATENT DOCUMENTS

| | | | |
|---|---|---|---|
| 727,368 A | 5/1903 | Howard | |
| 1,332,096 A | 2/1920 | Applegate | |
| 1,675,022 A * | 6/1928 | Creegan | A47K 5/05 401/88 |
| 2,243,634 A | 5/1941 | Kadish | |
| 2,770,071 A | 11/1956 | Endres | |
| 3,341,457 A * | 9/1967 | Schmidt | A47K 5/05 248/682 |
| 3,697,111 A | 10/1972 | Thompson | |
| 4,062,792 A * | 12/1977 | McNabb | C11D 17/048 15/104.93 |
| 4,501,354 A | 2/1985 | Hoffman | |
| 5,390,971 A | 2/1995 | Warren | |
| 8,926,205 B1 | 1/2015 | Allen | |
| 2005/0261149 A1 | 11/2005 | Mekus | |

FOREIGN PATENT DOCUMENTS

CN    202144491 U    2/2012

* cited by examiner

*Primary Examiner* — David Walczak
*Assistant Examiner* — Joshua Wiljanen
(74) *Attorney, Agent, or Firm* — Dwight Stauffer, Reg. Patent Agent

(57) ABSTRACT

Method and apparatus are disclosed for providing a bar of soap with a handle. A perforated attachment plate, or the like (which may be referred to as a "wafer") may be integrated into the body of the bar of soap, below a surface thereof. The handle, which may be in the form of a flexible strap, may have a lower portion extending underneath the wafer, and an upper portion extending as a loop from the wafer to outside of the bar of soap. A user may insert their hand into the loop to grasp and manipulate the bar of soap with handle. Various embodiments are disclosed.

17 Claims, 2 Drawing Sheets rectangular notch

SOAP WITH HANDLE

CROSS-REFERENCE TO RELATED APPLICATION(S)

This application claims benefit from provisional application No. U.S. 62/165,843 filed 22 May 2015.

TECHNICAL FIELD

The invention relates to soap bar constructions and, more particularly, to handles extending from the soap bars, allowing a user to conveniently grasp and manipulate a soap bar.

BACKGROUND

A common problem when bathing is holding a bar of soap in one's hand because the whole bar is slippery and often a rounded oblong shape. The problem is aggravated when the holder is rubbing the bar on body surfaces to apply soap because the hand cannot encircle the bar while leaving one whole face of the bar open to rub on the body. The user must trap the bar between a cupped hand and the body surface, plus follow the contours of the body as the bar is pushed around. This a tricky, acquired skill that requires a fair degree of dexterity plus a large enough, but not too large, hand; and/or a small enough, but not too small, bar of soap. Finger length, palm size, bar length/width dimensions as well as aspect ratio, and especially thickness of the bar all come into play. We are all familiar with the problem of using the soap after it gets to be less than about a half inch thick. It is so difficult to deal with that it often is simply thrown away, which is wasteful. Finally, extra consideration needs to be given to the fact that manual dexterity may decrease as one gets older.

A prior art way to deal with this problem is the "soap on a rope" concept, where a long loop of soft thick rope extends out of the longitudinal end of a roughly cylindrical bar of soap. The rope can be used to hang the soap on the shower or bath wall or put over one's head to keep it accessible in front of the user. This makes it easier to grab the soap and to apply soap to a washcloth or one's hand, but is awkward at best to rub the soap on one's body. Also, when the soap gets thin, it typically breaks apart and falls in pieces off of the rope, again causing waste as the remains are thrown away.

A conventional bar of soap becomes slippery when wet and is frequently dropped onto the shower stall floor or let loose in the bath water. During a shower the slippery bar of soap is especially a nuisance since a person must bend over in the shower stall to retrieve it, thereby getting their hair wet when it may be undesirable to do so. Having to bend over to retrieve the bar of soap may also be inconvenient to users who suffer from a bad back, who are arthritic or who may have a handicap that makes bending over difficult. In the shower, adults, as well as senior citizens, tend to lose their balance when bending over to pick up the bar of soap off the floor of the stall.

U.S. Pat. No. 5,390,971 (1995 Feb. 21; Warren) discloses a holder is provided for a bar of soap, which consists of a structure for affixing firmly into a surrounding mass on an outer surface of the bar of soap. A component is for holding a hand of a person. An element is for attaching the holding component to the affixing structure, so that the hand of the person can conveniently hold onto the bar of soap when it becomes wet and slippery.

SUMMARY

It is a general object of the invention to provide a bar of soap with a handle which will allow a user to hold onto and manipulate the bar of soap, especially when it gets wet and slippery. Methods and apparatus are disclosed.

As used herein, a "bar" of soap may comprise any solid (as distinguished from liquid) having a form such as rectangular, round, oval, etc. In the main, hereinafter, examples of soap bar with handle in which the bar is rectangular may be presented as exemplary.

According to the invention, generally, method and apparatus are disclosed for providing a bar of soap with a handle. A perforated (e.g., having holes, or a screen or mesh) attachment plate, or the like (which may be referred to as a "wafer") may be integrated into the body of the bar of soap, below a surface thereof. The handle, which may be in the form of a flexible strap, may have a lower portion extending underneath the wafer, and an upper portion extending as a loop from the wafer to outside of the bar of soap. A user may insert their hand into the loop to grasp and manipulate the bar of soap with handle.

Some benefits of the bar of soap with handle disclosed herein may include:

facilitating retaining the bar of soap in the palm of hand for use, without effort needed to hold it.
  reducing the likelihood of dropping the bar of soap into bath water, where it may become sticky and then dissolve into the bath water.
  reducing the likelihood of dropping the bar of soap onto the floor of a shower where it may be slippery and difficult to pick up.
  providing a holder for a bar of soap that is simple and easy to use.
  providing a holder for a bar of soap that is economical in cost to manufacture.

According to some embodiments (examples) of the invention, a bar of soap with handle may comprise: a bar of soap; and a handle having a lower portion embedded in the bar of soap below an outer surface thereof, and an upper portion extending as a loop above the bar of soap. The bar of soap may further comprise an attachment plate comprising a generally planar element embedded in the bar of soap. The attachment plate may be perforated. A plurality of holes may extend through the attachment plate. The attachment plate may comprise a mesh or screen. The lower portion of the handle may be formed integrally with the attachment plate. The lower portion of the handle may be disposed underneath the attachment plate. The attachment plate may comprise notches at opposite ends thereof; and the handle may comprise a strap which nestles in the notches. The notches may be shaped to retain a portion of the strap passing through the notches. Protrusions may be disposed on the notches to retain a portion of the strap passing through the notches. The handle may comprise a D-shaped strap, wherein the lower portion is substantially straight and the upper portion is arcuate. The handle may comprise a strap which is semi-rigid, flexible, or elastic. The upper portion of the strap may be sized to loop around the back of a user's hand with the strap passing between index finger and thumb, thereby locating the soap bar in a user's palm.

According to some embodiments (examples) of the invention, a method of making a bar of soap with handle may comprise: providing a mold; providing a wafer within the mold; and providing a strap having a lower portion attached to the wafer and an upper portion extending above the wafer. The lower portion of the strap may pass under the wafer, within the mold. The lower portion of the strap may be integral with the wafer. Perforations may be provided through the wafer. Liquefied soap may be poured into the mold, and allowed to harden into a bar of soap that contains the wafer and the lower portion of the strap. The strap may be D-shaped, wherein the lower portion is substantially straight and the upper portion is arcuate. The strap may be semi-rigid, flexible, or elastic.

Other objects, features and advantages of the invention may become apparent in light of the following descriptions of various embodiments thereof.

BRIEF DESCRIPTION OF THE DRAWINGS

Reference may be made to embodiments of the invention, non-limiting examples of which may be illustrated in the accompanying drawing figures (FIGS.). Some elements in the figures may be exaggerated, others may be omitted, for illustrative clarity. Similar elements in various figures may be similarly numbered, such as element 215 being similar to element 115, the most significant digit(s) of the reference numeral may correspond to the figure number (such as FIG. "2"). Terms of orientation such as "top", "bottom", "left", "right", "front", "back", and the like may be used to indicate relative positions of elements with respect to one another, or portions of a given element with respect to one another. Any text (legends, notes, reference numerals and the like) appearing on the drawings are incorporated by reference herein.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199*a*, 199*b*, 199*c*, etc. Or, related but modified elements may have the same number but are distinguished by primes. For example, 109, 109', and 109" are three different versions of an element 109 which are similar or related in some way but are separately referenced for the purpose of describing modifications to the parent element (109). Such relationships, if any, between similar elements in the same or different figures will become apparent throughout the specification, including, if applicable, in the claims and abstract.

Figure 1:
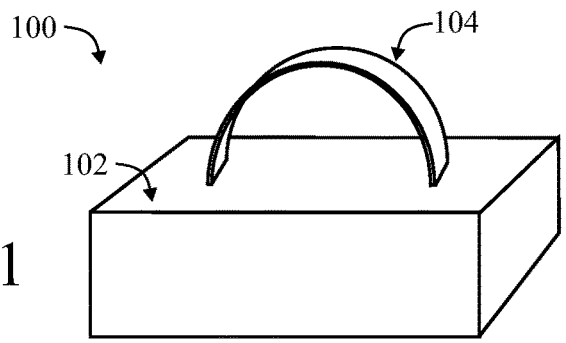

The structure, operation, and advantages of the present preferred embodiment of the invention will become further apparent upon consideration of the following description taken in conjunction with the accompanying drawings, wherein:

FIG. 1 is a diagram, in perspective view of a bar of soap with handle, according to the invention.

Figure 2:
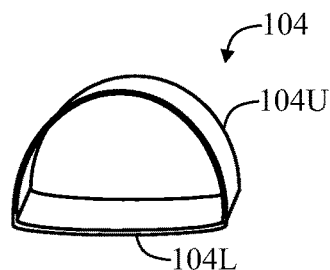

FIG. 2 is a diagram, in perspective view, of a handle (or strap) for the bar of soap with handle shown in FIG. 1.

Figure 3:
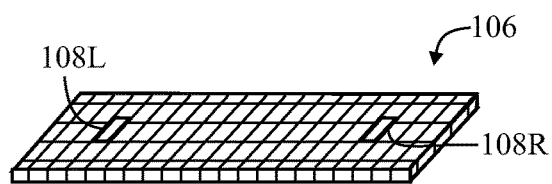

FIG. 3 is a diagram, in perspective view, of an attachment plate (or "wafer") for the bar of soap with handle shown in FIG. 1.

Figure 4:
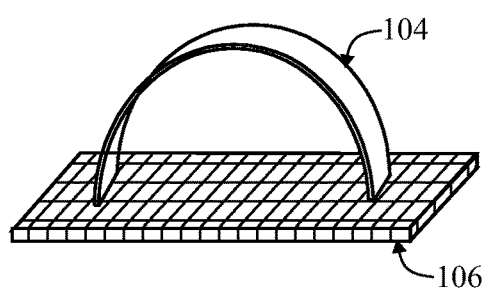

FIG. 4 is a diagram, in perspective view, of the handle and wafer for the bar of soap with handle shown in FIG. 1.

Figure 5:
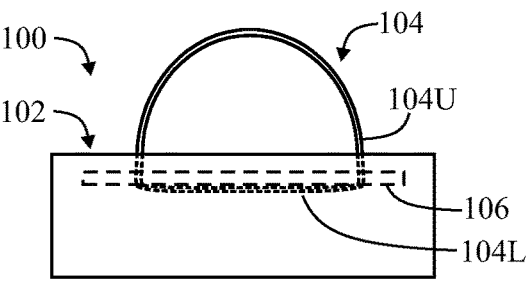

FIG. 5 is a diagram, in side view, of the bar of soap with handle shown in FIG. 1.

Figure 6:
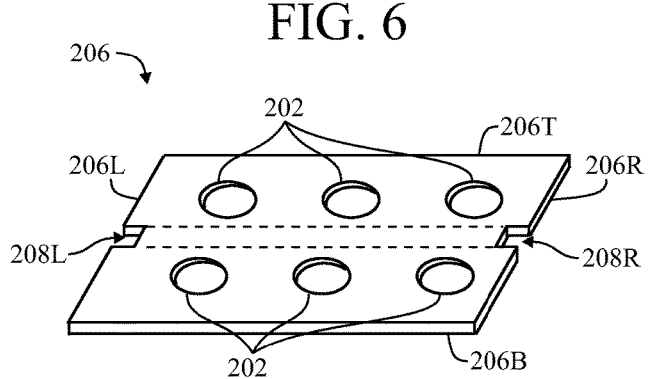

FIG. 6 is a diagram, in perspective view, of an attachment plate (or "wafer") for the bar of soap with handle shown in FIG. 1.

Figure 6A:
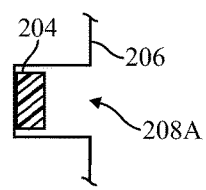

FIGS. 6A,B,C,D are diagrams, in partial plan view, illustrating some different shapes for notches in an attachment plate (or wafer), and a portion of a strap handle (in cross-section) passing through the notches.

Figure 7:
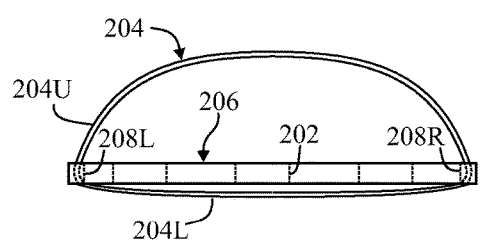

FIG. 7 is a diagram, in side view, of the handle and wafer for the bar of soap with handle shown in FIG. 1.

Figure 8:
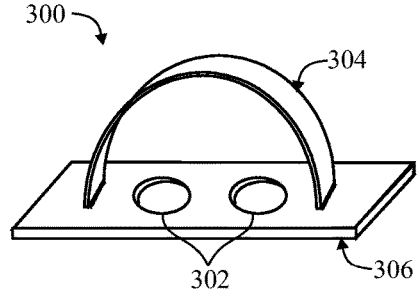

FIG. 8 is a diagram, in perspective view, of the handle and wafer for the bar of soap with handle.

DETAILED DESCRIPTION

Various embodiments will be described to illustrate teachings of the invention(s), and should be construed as illustrative rather than limiting. Although the invention may be described in the context of various exemplary embodiments, it should be understood that it is not intended to limit the invention to these particular embodiments, and individual features of various embodiments may be combined with one another.

FIG. 1 shows an embodiment (example) of a soap with handle 100 comprising:
   a bar 102 of soap which may typically be rectangular, but which may have other shapes such as round, oval, oblong, etc.
   a handle 104 which may be in the form of a strap extending from within the bar of soap to external to the bar of soap, on one side of the bar, forming a loop external to the bar of soap which may be sized such that a user may insert their hand into the loop.

The strap may be semi-rigid, flexible, or elastic. The strap loop dimensions may be sized to loop around the back of the user's hand with the strap passing between index finger and thumb, thereby locating (securing) the soap bar in the user's palm. A D-shaped loop is shown as a non-limiting example. For example, when the bar length does not exceed a typical palm width, then the strap can extend upward to provide enough loop circumference to wrap around the user's larger (than the bar of soap) palm.

The bar can be any shape, but the rectangular shape shown is well established as a convenient overall aspect ratio that may include a flattened football shape, or a rectangle with extremely rounded off corners. It could also be somewhat like a hockey puck, etc. without limits other than whatever makes it convenient for use as a bar of soap.

The strap makes it simple to pick up the soap out of a soap dish, and is likewise easy to pull onto the hand, all by holding the strap instead of trying to grip the slippery soap itself. Once on the hand, the soap can be moved (manipulated) to soap the body without even needing to grip the sides of the bar.

FIGS. 2-5 show an example of making the product of FIG. 1, using a handle which comprises an elastic band (FIG. 2) and an attachment/embedding plate or "wafer" 106 (FIG. 3), which are assembled (FIG. 4), and then embedded in a bar of soap (FIG. 5) relatively close to the top surface thereof to maximize the amount of the soap that can be rubbed away (used) from the side of the bar facing away from the palm of the hand. This enables the user to continue use of the bar until only a thin sliver of the bar remains.

In the illustrated embodiment, the band may be a heavy duty rubber band. A convenient size and shape may be like the wrist bands that are popular (e.g., approximately ½" (1.25 cm) wide, approximately 1/16" (1.5 mm) thick, and having a length suitable to encircle the palm of a user's hand.

The band may have two ends attached to corresponding two ends of the wafer, for example at slots 108L and 108R.

Alternatively, as shown, the band (handle, strap) 104 may extend around and pass under the wafer, forming a single continuous loop, a lower portion 104L of which is disposed within the bar of soap, and an upper portion 104U (or loop) of which is disposed external to the bar of soap. The upper portion may be sufficiently long, such as 5"-6" (12 cm-15 cm) long, to form a loop which may extend resiliently (in the case of an elastic band) over the back of the user's hand, with the palm of the user's hand disposed against the top surface of the bar of soap. The lower portion, which is embedded in the bar of soap, should be sufficiently long to wrap (extend) around the ends of the wafer (or in slots in the ends of the wafer), and underneath the wafer. (This may be referred to as the lower portion of the strap being attached to the wafer. As discussed below, portions of the strap may engage notches in the wafer, and the lower portion of the strap may be formed integrally with the wafer.) The band, as best viewed in FIG. 2, may be D-shaped, the lower portion being substantially straight, the upper portion being curved. Any type of waterproof band could be used. The band 104 may extend through slots 108L and 108R on opposite left and right (as viewed) ends of the attachment plate (wafer) 106. For use with a band 104 being a continuous loop, the slots 108L and 108R may have a cut (not shown) extending out to an edge of the wafer 106 to enable insertion of the band 104 in the slots 108L and 108R. The overall strap may be D-shaped, having a substantially straight lower portion embedded in the soap bar, and a substantially curved (arcuate) portion (or loop) extending above the soap bar.

The attachment plate (or wafer) 106 may comprise a generally planar element, which may be perforated, such as a stiff screen or mesh (e.g., plastic). In the process of manufacturing the bar of soap, the wafer and strap (FIG. 4) may be held in position in a mold while it is being filled with liquefied soap that will harden into a bar that contains the wafer and strap. The lower portion 104L of the handle is disposed underneath the attachment plate 106. Generally, the term "perforated", as it refers to the attachment plate, may refer to a plate that has holes, or to a generally planar mesh or screen. There may be few perforations (such as holes) in the attachment plate, or many (as in the case of a screen or mesh).

Some Other Embodiments

In FIGS. 1-5, the attachment plate (wafer) 106 is shown as a screen or mesh. The handle 104 is D-shaped.

FIGS. 6-7 illustrate that the attachment plate (wafer) may be in the form of a generally rectangular planar element 206 (compare 106) having a length, a width, a left (as viewed) end 206L and a right (as viewed) end 206R, a top (as viewed) surface 206T and a bottom (as viewed) surface 206B, and a thickness. The length is the distance between the two opposite ends 206L/206R. The thickness is the dimension between the top and bottom surfaces 206T/206B.

The attachment plate (wafer) may be perforated with a number (six shown) of holes 202 extending through the attachment plate 206, between its top and bottom surfaces. The holes may have a diameter of approximately ⅛-⅜ inch (3-9 mm) diameter, such as 5/16 inch (8.5 mm). A plurality of holes of the same or different sizes may be disposed across the area of the attachment plate (wafer) in a regularly spaced array, or in any other desired pattern, to allow soap to enter the holes and secure the attachment plate in the bar of soap.

The attachment plate (wafer) 206 may also have notches 208L and 208R (which may collectively be referred to as "208") in its left and right ends 206L and 206R, respectively, for accepting the strap 204 (compare 104). In FIG. 6, the dashed lines between the notches are indicative of the lower portion 204L of the strap passing underneath the attachment plate (wafer). The upper portion 204U of the strap may be D-shaped, as in FIG. 2. The handle may comprise a strap which nestles in the notches.

FIG. 6A shows that the notches 208A may be generally rectangular, extending across the attachment plate 206 from opposite (left and right, as viewed) ends 206L/206R thereof. For example, a notch 208 may be approximately ½ inch wide to accept an approximately ½ inch wide strap (handle), and may extend approximately ⅜ inch across each end of the attachment plate 206L/206R. The handle 204 may be a flexible strap, such as a rubber wristband which nestles in (is disposed passing through) the notches 208.

Figure 6B:
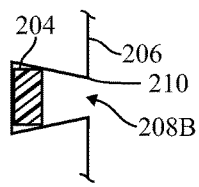
Figure 6C:
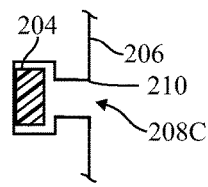
Figure 6D:
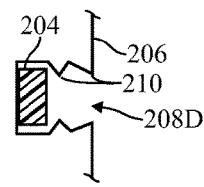

In order to retain the flexible rubber strap handle in proper position on the attachment plate 206, prior to molding and/or as the bar of soap is worn thin in use, the notches 208 may have inward directed protrusions 210 disposed on them. For example, the notches 208B may be trapezoidal (tapered, from narrower at the edge to wider at the interior), as shown in FIG. 6B or the notches 208C may be T-shaped, as shown in FIG. 6C so that the strap handle 204 (shown in section) needs to be twisted and urged into the notches. Alternatively, as shown in FIG. 6D, the notches 208D may be provided with barbed protrusions 210 to retain the relevant portion of the strap handle within (passing through) the notches. The strap handle may initially be a circular flexible band, such as a wristband. When installed on the attachment plate, it is intended to acquire a D-shape (the upper portion forming a loop, the lower portion spanning substantially straight across the bottom of the attachment plate). With an open ended rectangular notch 208A, such as shown in FIG. 6A, the strap handle 204 may tend to spring out of the notches (resuming its original circular shape). The notches shown in FIGS. 6B,C,D are designed to retain the strap handle in its D-shape (resisting springing out of the notches 208).

FIG. 8 shows an alternative construction 300 of a handle. The strap 304 and wafer 306 may be formed integrally, as one piece with one another. For example, the wafer 306 could be formed integrally, as one piece, with the lower portion (compare 204L) of the strap 304. The combined lower portion/wafer 306 may be embedded in the bar of soap, below an outer surface thereof. The wafer portion of the resulting strap handle may have perforations, e.g., holes 302 (compare 202).

Some Exemplary Dimensions and Materials

The wafer may be in the form of a perforated plate or screen which, for a generally rectangular bar of soap, may be rectangular and which may measure slightly less in length and width than the bar of soap. For example, for a bar of soap measuring approximately 9 cm×6 cm, the wafer may measure 6 cm×4 cm, the larger of the two dimensions being the length, the smaller of the two dimensions being the width.

The wafer may be formed of plastic, and may have a thickness of approximately 0.5 mm-1.5 mm, such as 1.0 mm.

The handle, which may be a flexible strap, such as of a plastic material, may extend from below the wafer, past ends of the wafer, to outside the bar of soap, forming a loop external to the bar of soap. The loop may measure approximately 15 cm in length, 1.0 cm-3.0 cm in width, and may have a thickness of approximately 1 mm.

A method of making a bar of soap with handle may comprise:

providing a mold (not shown);

providing a wafer within the mold;
providing a strap having a lower portion passing under the wafer within the mold, and an upper portion extending above the wafer;
pouring liquefied soap into the mold; and
allowing the liquefied soap to harden into a bar of soap that contains the wafer and the strap.

Given the teachings set forth herein, many ways of manufacturing variations of this product and its manufacture may become apparent to one of ordinary skill in the relevant arts, and all such variations are to be considered within the scope of this invention.

While the invention has been described with respect to a limited number of embodiments, these should not be construed as limitations on the scope of the invention, but rather as examples of some of the embodiments. Those skilled in the art may envision other possible variations, modifications, and implementations that are also within the scope of the invention, based on the disclosure(s) set forth herein.

What is claimed is:

1. Bar of soap with handle, comprising:
a bar of soap;
a handle having a lower portion embedded in the bar of soap below an outer surface thereof, and an upper portion extending as a loop above the bar of soap, and
an attachment plate comprising a generally planar element embedded in the bar of soap; wherein:
the attachment plate comprises notches at opposite ends thereof; and
the handle comprises a strap which nestles in the notches.

2. The bar of soap with handle of claim 1, wherein:
the attachment plate is perforated.

3. The bar of soap with handle of claim 1, further comprising:
a plurality of holes extending through the attachment plate.

4. The bar of soap with handle of claim 1, wherein:
the attachment plate comprises a mesh or screen.

5. The bar of soap with handle of claim 1, wherein:
the lower portion of the handle is formed integrally with the attachment plate.

6. The bar of soap with handle of claim 1, wherein:
the lower portion of the handle is disposed underneath the attachment plate.

7. The bar of soap with handle of claim 1, wherein:
the notches are shaped to retain a portion of the strap passing through the notches.

8. The bar of soap with handle of claim 1, further comprising:
protrusions disposed on the notches to retain a portion of the strap passing through the notches.

9. The bar of soap with handle of claim 1, wherein:
the handle comprises a D-shaped strap, wherein the lower portion is substantially straight and the upper portion is arcuate.

10. The bar of soap with handle of claim 1, wherein:
the handle comprises a strap which is semi-rigid, flexible, or elastic.

11. The bar of soap with handle of claim 1, wherein:
the handle comprises a strap; and
the upper portion of the strap is sized to loop around the back of a user's hand with the strap passing between index finger and thumb, thereby locating the soap bar in a user's palm.

12. Method of making a bar of soap with handle, comprising:
providing a mold;
providing an attachment plate within the mold, wherein the attachment plate comprises a generally planar element with notches at opposite ends thereof, the notches being shaped to retain a portion of a strap passing therethrough;
providing a handle comprising a strap having a lower portion within the mold, passing under the attachment plate and nestling in the notches, and having an upper portion extending as a loop above the attachment plate;
pouring liquefied soap into the mold; and
allowing the liquefied soap to harden into a bar of soap that contains the attachment plate and the lower portion of the strap.

13. The method of claim 12, wherein:
the lower portion of the strap is integral with the attachment plate.

14. The method of claim 12, further comprising:
providing perforations through the attachment plate, the perforations forming one or more holes, or a mesh or a screen.

15. The method of claim 12, wherein:
the strap is D-shaped, wherein the lower portion of the strap is substantially straight and the upper portion of the strap is arcuate.

16. The method of claim 12, wherein:
the strap is semi-rigid, flexible, or elastic.

17. The method of claim 12, further comprising:
disposing protrusions on the notches to retain a portion of the strap passing through the notches.

* * * * *